United States Patent [19]

DeBlois

[11] 4,245,803
[45] Jan. 20, 1981

[54] TWO-DIMENSIONAL INLET FOR A HIGH SPEED WINGED FLIGHT VEHICLE

[75] Inventor: Raymond L. DeBlois, Tolland, Conn.

[73] Assignee: United Technologies Corporation, Hartford, Conn.

[21] Appl. No.: 930,468

[22] Filed: Aug. 2, 1978

[51] Int. Cl.² ............................................ B64D 33/02
[52] U.S. Cl. ................................ 244/53 B; 137/15.1; 244/15
[58] Field of Search .............. 244/53 B, 55, 1 N, 74, 244/15, 14; 137/15.1, 15.2; 102/49.3, 37.1

[56] References Cited

U.S. PATENT DOCUMENTS

| 2,596,435 | 5/1952 | Robert | 244/74 |
| 2,990,142 | 6/1961 | Ferri | 244/53 B |
| 2,997,256 | 8/1961 | Walker | 244/15 |

Primary Examiner—Barry L. Kelmachter
Attorney, Agent, or Firm—Norman Friedland

[57] ABSTRACT

For a winged high speed missile that includes a two-dimensional inlet supplying air to the missile power plant, the compression ramp of the inlet is oriented with respect to the outwash angle produced by the missile body and the underneath surface of the wing such that the compression ramp of the inlet is subjected to an effective angle of attack. By proper inlet orientation the captured flow is turned inwardly toward the missile center line further compressing the incoming air.

3 Claims, 4 Drawing Figures

TWO-DIMENSIONAL INLET FOR A HIGH SPEED WINGED FLIGHT VEHICLE

The Government has rights in this invention pursuant to Contract No. F33615-76-C-2131 awarded by the Department of the Air Force.

BACKGROUND OF THE INVENTION

This invention relates to high speed missiles that incorporate winged surfaces and particularly to the orientation of a two-dimensional inlet relative to the winged surface and missile body.

As is well known in the art, the inlet of a missile air breathing power plant must be judiciously located to reduce drag while satisfying packaging restriction and weight limitations. Such location takes into consideration the shock waves, flow angles, and other flow properties produced by the bow of the missile and the leading edge of the wing. Because of the high altitude requirements of some air breathing missiles, wings are utilized to generate the necessary lift characteristics. If two-dimensional inlets are integrated under the wings in a conventional downward turning orientation, the inlets will be effectively exposed to zero angle of attack conditions since the flow approaching the inlets must be aligned with the undersurface of the wings. However this orientation would not be totally satisfactory owing to the outwash produced by the undersurface of the wing and vehicle body. In such an orientation, the outwash flow would effectively subject the two-dimensional inlets to a yaw condition which, characteristically, would degrade inlet performance.

I have found that I can improve inlet performance by orienting it relative to the outwash angle induced by the wing and missile body such that the inlet sees an effective angle of attack rather than a yaw condition. This is a favorable situation since, in general, the performance of two-dimensional inlets is enhanced with increasing angle of attack.

SUMMARY OF THE INVENTION

A feature of this invention is orienting the two-dimensional inlet of the air breathing power plant of a high speed winged missile relative to the outwash angle produced by the underneath surface of the wing and missile body such that the compression ramp of the inlet sees a favorable angle of attack.

Other features and advantages will be apparent from the specification and claims and from the accompanying drawings which illustrate an embodiment of the invention.

DESCRIPTION OF THE PREFERRED EMBODIMENT

Figure 1:
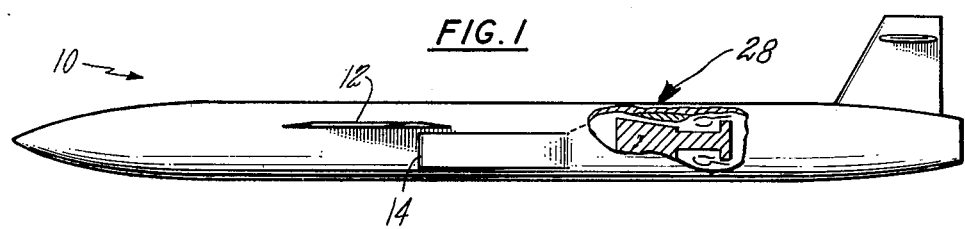
FIG. 1 is an elevated view of a winged missile embodying this invention.

Referring to FIG. 1, a missile is generally illustrated by reference numeral 10 including swept wings 12 and the two-dimensional inlet 14. While, as one skilled in the art will appreciate, this invention finds utility in a winged high speed vehicle having a two-dimensional inlet, the scope of the invention is not limited to a particular shape of the vehicle.

Figure 2:
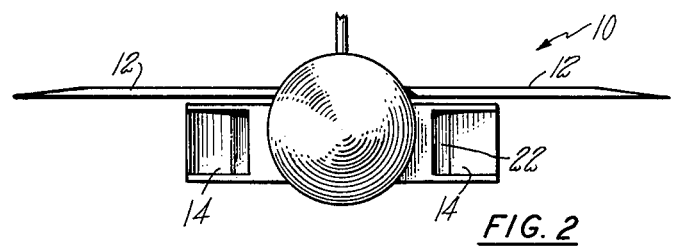
FIG. 2 is a front view particularly showing the orientation of the compression ramp.
Figure 3:
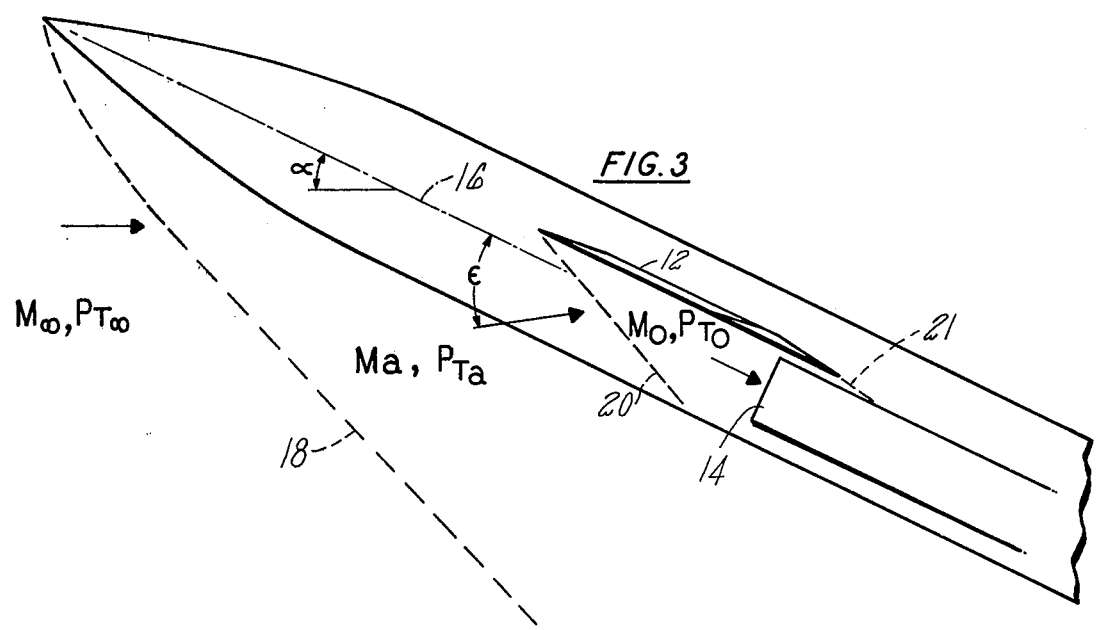
FIG. 3 is a fragmentary side view illustrating the flow characteristics of the air stream when the missile is in high speed flight condition.
Figure 4:
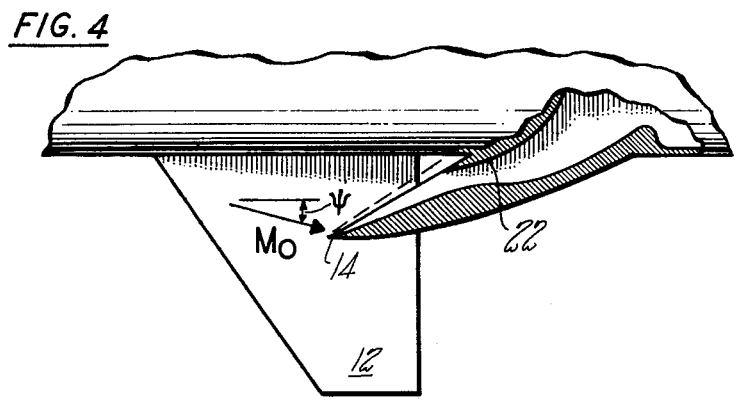
FIG. 4 is a fragmentary view partly in section illustrating the orientation of the compression ramp relative to the outwash angle for a high speed flight condition.

The invention can best be seen by referring to FIGS. 2 and 4 where FIG. 2 is a front view of the invention showing the highly integrated aspects of the inward turning inlet concept. The inlets 14 are oriented such that the wing 12 acts as a precompression device for the inlets and the captured flow is compressed by turning towards the missile center line 16. Inlets 14 are installed under wings 12 using boundary layer diverters in a conventional manner to reduce interaction between the vehicle surface boundary layer and the flow captured by the inlets. Likewise, the inlets are displaced below the surface of the wing such that no significant interaction occurs between the wing boundary layer and the inlet flow. A side view of the missile at a free stream Mach number, $M_\infty$, and an arbitrary angle of attack, $\alpha$, is shown in FIG. 3. Local flow properties downstream of the vehicle bow shock represented by dash line 18 and upstream of the wing are represented by the local Mach number, $M_a$, total pressure, $P_{T_a}$, and flow angle $\epsilon$. Downstream of the wing shock represented by dash line 20, the flow properties approaching the inlet are characterized by the local Mach number, $M_o$, and total pressure, $P_{T_o}$. Since the flow must be aligned with the undersurface of the wing, the inlet is subjected to zero flow angularity in this view. This effectively places the inlet at zero yaw, a condition which maximizes two-dimensional inlet performance. Axially, the inlet is positioned far enough behind the wing leading edge to prevent interaction with the leading edge Mach line at the maximum Mach number, $M_a$. Likewise the inlet cowl 22 should be positioned forward of the wing trailing edge Mach line identified by reference number 21 at the minimum Mach number.

As can be seen in FIG. 4, the bottom view shows that, although the flow is parallel to the undersurface of the wing, a significant outwash angle, $\psi$, persists. Existence of the outwash angle effectively places the inward turning inlet at an angle of attack, a condition which characteristically improves the performance of a two-dimensional inlet under most operating conditions. The inlet must be positioned radially from the missile center line such that the inlet oblique bow shock reflected from the vehicle surface intersects the inlet behind the cowl lip plane at the lowest operating Mach number, $M_o$, and highest sidewash angle, $\psi$, combination. In this design there is no need to turn the compressed flow back to an axial direction within the throat region as is the case with conventional outward turning or downward turning configurations. Rather the flow which has been turned inward via the inlet compression continues to flow inward to the engine (shown in section as reference numeral 28) during the conventional subsonic diffusion process thus promoting lower internal losses and a shorter, lightweight inlet relative to the conventional designs.

It should be understood that the invention is not limited to the particular embodiments shown and described herein, but that various changes and modifications may be made without departing from the spirit and scope of this novel concept as defined by the following claims.

I claim:

1. For a high speed missile powered by an airbreathing engine, said missile comprising a body and wings having a longitudinal axis and providing lift, a pair of two-dimensional air inlets, one of said inlets mounted on each side of the missile under and proximate the aft end of an associated one of said wings for leading air to said engine, each of said two-dimensional air inlets having a compression ramp oriented in a vertical plane with respect to the wing axis so as to produce an inward turning of the air with respect to a missile center line and each of said inlets aligned with an outwash angle produced by the missile body and undersurface of said associated one of said wings to be at substantially zero yaw condition.

2. For a high speed missile as in claim 1 wherein each of said inlets is mounted sufficiently axially behind the leading edge of said associated one of said wings so as to be behind the leading edge Mach line at the maximum Mach number.

3. For a high speed missile as in claim 2 wherein each of said inlets has a cowl and the position of the cowl inlet is forward of the trailing edge of said associated one of said wings so the inlet cowl is positioned forward of the wing trailing edge Mach line at the minimum Mach number.

* * * * *